Figure 1:
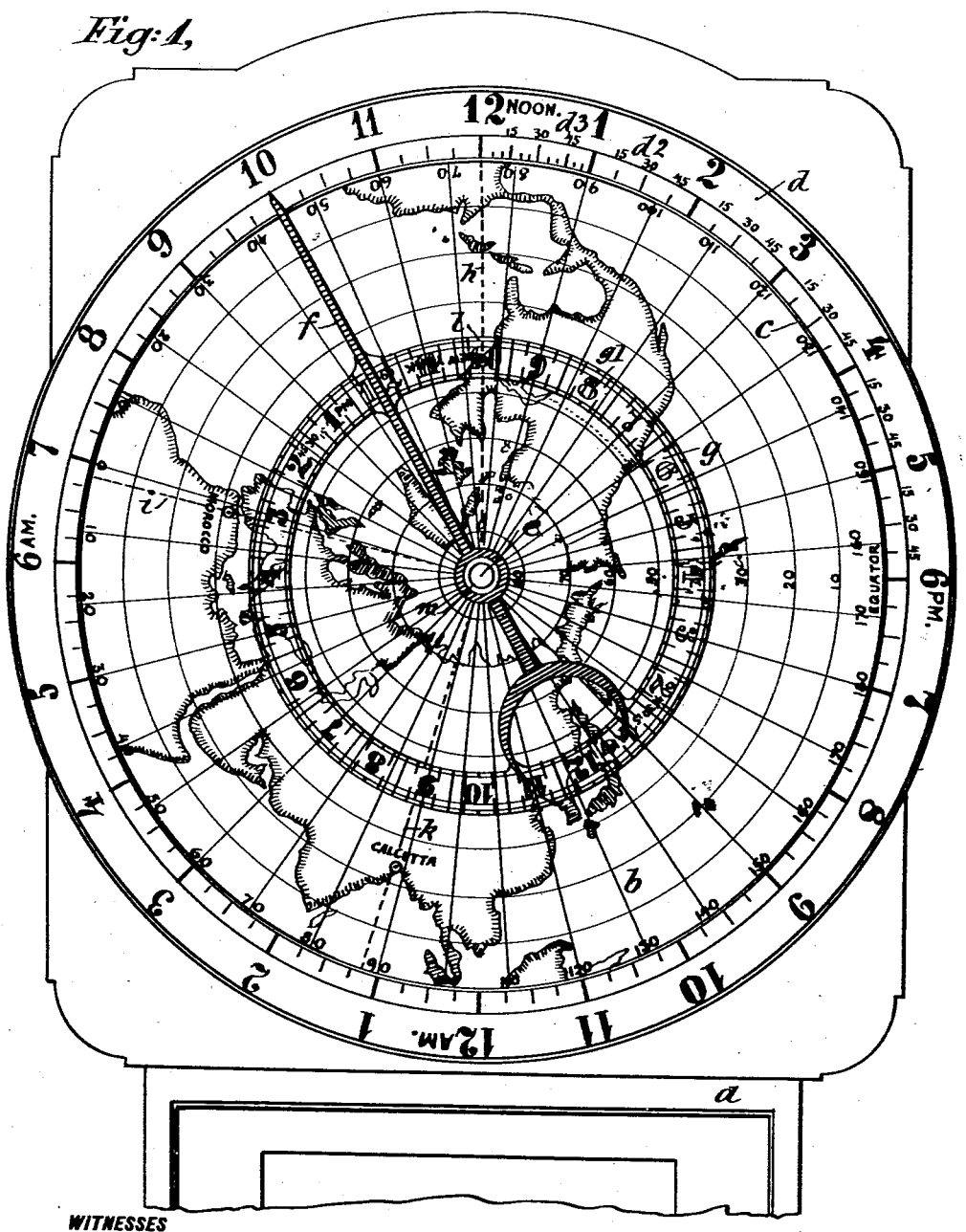

No. 862,884. PATENTED AUG. 13, 1907.
P. G. CONNOR.
GEOGRAPHICAL CLOCK.
APPLICATION FILED MAR. 26, 1906.

2 SHEETS—SHEET 1.

WITNESSES

INVENTOR
Patrick G. Connor,
BY
Edgar Tate & Co
ATTORNEYS

No. 862,884. PATENTED AUG. 13, 1907.
P. G. CONNOR.
GEOGRAPHICAL CLOCK.
APPLICATION FILED MAR. 26, 1906.
2 SHEETS—SHEET 2.
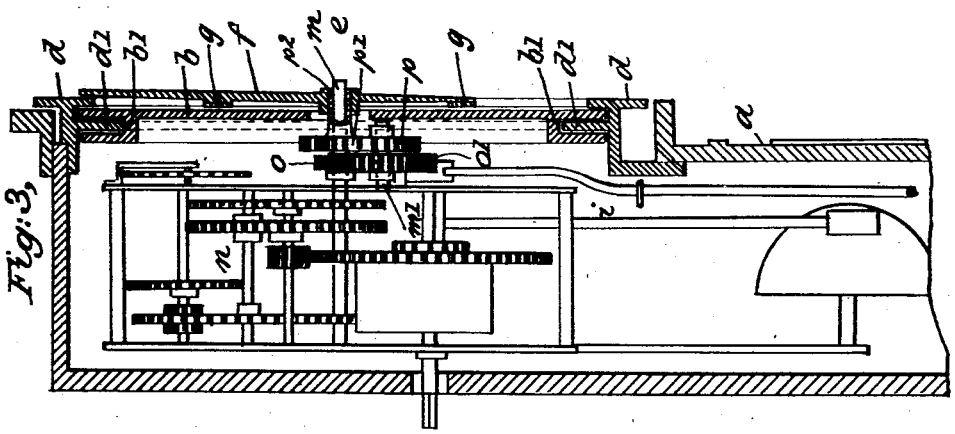
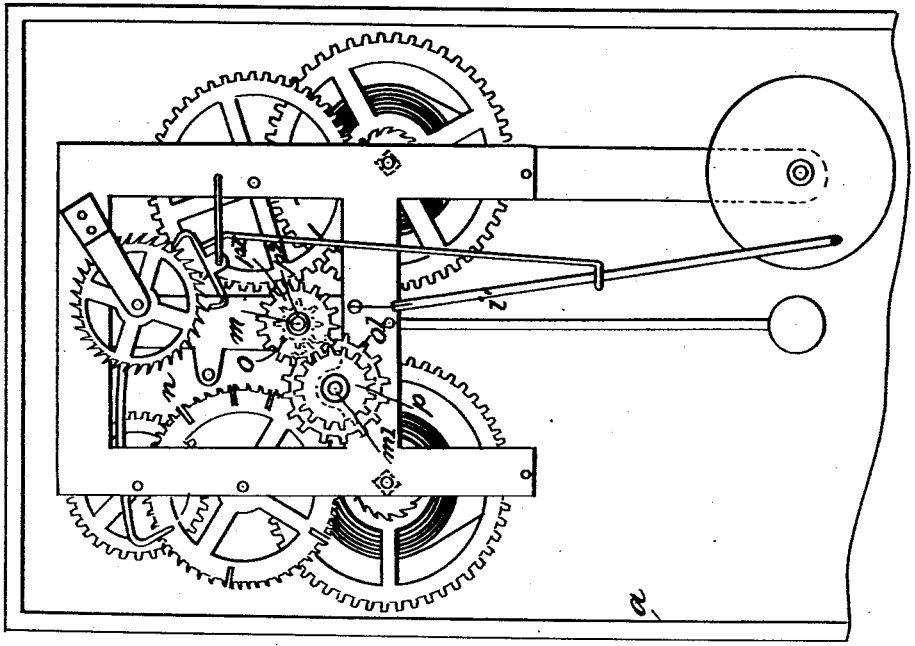
WITNESSES
INVENTOR
Patrick G. Connor,
BY
ATTORNEYS

UNITED STATES PATENT OFFICE.

PATRICK G. CONNOR, OF NEW YORK, N. Y.

GEOGRAPHICAL CLOCK.

No. 862,884.   Specification of Letters Patent.   Patented Aug. 13, 1907.

Application filed March 26, 1906. Serial No. 307,954.

*To all whom it may concern:*

Be it known that I, PATRICK G. CONNOR, a citizen of the United States, and residing at New York, in the county of New York and State of New York, have invented certain new and useful Improvements in Geographical Clocks, of which the following is a specification, such as will enable those skilled in the art to which it appertains to make and use the same.

This invention relates to an improvement in geographical clocks, and the object thereof is to provide a device of this class with means for indicating at a glance to the observer the time of the day or night at his place of observation as well as at any other part of the northern or southern hemisphere; and a further object being to furnish to the users of such improved time piece especially for nautical calculations, means of computing distances between his temporary point of observation and other distant places, and with these and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which;—

Figure 1 is a front view of a time piece provided with my improvement; Fig. 2 a front view of the clock mechanism; and, Fig. 3 a vertical sectional view taken at right angles to Fig. 2.

In the drawings $a$ represents the casing of an ordinary thirty days pendulum clock to which my invention has been attached, however, in practice my invention can be applied to time pieces of various construction and of various time indicating duration.

Taking the place of an ordinary dial, I provide a rotatable disk $b$ which has accurately printed thereon a map representing one of the hemispheres of the earth, with radial lines extending from its center to its periphery which indicate the longitudinal meridians counted from any approved observatory and with concentric lines indicating the latitudes of the various places as indicated on the map on the disk $b$. The outer line $c$ of the disk $b$ represents the equator and the center of the disk is either the north or south pole according to the nature of the hemisphere displayed. In the drawing, Fig. 1, the northern hemisphere of the earth is indicated for illustration.

An outer ring $d$ is fastened stationary to the clock frame $a$ and is provided with an inner annular extension $d^1$ which acts as a guide for the rotatable disk $b$, which latter forms at $b^1$ a ring-shaped socket whereinto the guide $d^1$ of the ring $d$ projects and which arrangement or any other similar one will enable the operator to revolve the disk $b$ around its axis at $e$. This ring $d$ is the time dial proper and is divided in twenty-four equal main divisions, each one representing one hour. A clock hand $f$ therefore will pass during one revolution over the twenty-four hours of time during one day and one night. Each one of the main hour divisions is sub-divided in the usual manner in minutes, one-quarter, one-half and three-quarter hours, the drawing showing at $d^2$ such sub-division in one-quarter and one-half hour, and at $d^3$ a similar sub-division and with a further division each one indicating five minutes. It is obvious that this sub-division may be continued to minutes, each hour division therefore can be made to indicate sixty minutes as is usual with time pieces of ordinary use.

The hour division on the stationary dial indicate on the upper half circle the twelve hours of the day, and on the lower half-circle the twelve hours of the night, the central upper point of division at twelve, noon, representing zenith.

The hour hand $f$ which is permanently attached to the clock driving mechanism as hereinafter more fully described carries permanently attached to itself an annular ring $g$, which is preferably made of transparent material so as to permit the observation of those parts indicated on the dial map which otherwise would be covered by the same. This annular ring $g$ is also divided into twenty-four main parts, each one representing one hour, and each main division has a similar sub-division which may be extended to sixty parts each, if so desired and corresponds in its scale divisions to that of the stationary time dial $d$. This annular ring $g$ rotates with the hour hand $f$ and when the latter points to zenith—twelve o'clock noon—the time division: twelve noon on the rotatable dial $g$, also indicates noon. One-half of these divisions from 12—12 and indicated with light figures as at $g^1$ represent hours, etc., of the day, while the other half shown in shaded figures represent the hours, etc., of the night.

In the operation of my apparatus the user of the same rotates the disk $b$ until the meridian of his place of observation points to zenith. In the drawing Fig. 1, New York city being assumed as the place where this time piece is being used, the meridian $h$ passing through New York city as shown, is placed in line with zenith—twelve noon—, and it is further assumed that at the time of observation the clock indicates 10 a. m. If it is now desired to ascertain the time of day or night at any other place of the northern hemisphere as at Morocco, the operator observes the intersection of the corresponding meridian $i$ of Morocco with the rotatable time dial $g$ and finds thereon indicated at such intersection the time 3 h. 8 m. p. m. or as at Calcutta where the meridian $k$ intersecting the rotatable time dial $g$ will indicate the hour of 8 h. 50 m. p. m. which is the actual time at these places at the time of observation at New York city and at 10 a. m. In a reverse manner the rotatable time dial $g$ also indicates to the observer the time of the place of observation as is shown at $l$ on the disk $b$ where the meridian of New York intersects the same. It is obvious that in case an operator residing at New York city desires to ascertain the difference of time between any other two locations on the northern or southern hemisphere as per example, the difference of time between Morocco and Calcutta all he needs to do is to rotate the dial $d$ so as to bring its meridian $i$ to zenith and observe the time indication on the rotatable disk $b$ as shown by the intersection of the meridian of Calcutta on the same and the meridian passing to zenith.

As heretofore described, the clock mechanism is provided with but one hand which during twenty-four hours makes but one revolution. This is accomplished by means of the mechanism as illustrated in Figs. 2 and 3 of the drawings, in which $m$ is a main stem actuated upon and set in motion in the usual manner by means of any ordinary clock mechanism $n$. The usual minute hand and its actuating gear wheels are removed and in place thereof the usual pinion $o$ fastened to the main stem $m$ gears into a wheel $o^1$, their diametrical proportions being as 1 to 2. Attached to the stem $m^1$ to which the gear wheel $o^1$ is fastened is the gear wheel $p$ which meshes with another gear wheel $p^1$ and is of equal diameter therewith. The gear wheel $p^1$ with its sleeve $p^2$ loosely rotates upon the main stem $m$ and fastened to the outer circumference of the sleeve $p^2$ is the hour hand $f$ and its attached annular rotatable time dial $g$ as heretofore described. It will therefore be seen that the main stem $m$ which usually makes two revolutions in twenty-four hours transmits its motion to the gear wheel $p^1$, its sleeve $p^2$ and its attached hour hand $f$ in such a manner that the latter will make but one revolution instead of the two revolutions usual in clock mechanism for ordinary construction.

In Fig. 2 at $i^1$ the usual striking mechanism is illustrated which may or may not be used in connection with my apparatus, Having fully described my invention, what I claim as new and desire to secure by Letters Patent, is:—

1. A geographical clock, comprising a clock mechanism provided with a pointer or hand which makes one revolution in every twenty-four hours, a permanently fixed circumferential time dial which is radially scaled so as to indicate in two separate divisions of twelve hours each the successive twenty-four hours of the day and their sub-divisions, a rotatable disk placed within said circumferential time dial and provided with a map of the Northern or Southern Hemisphere and an annular scale placed between said rotatable disk and said permanently fixed circumferential dial indicating hours and subdivisions thereof for a continuous twenty-four hours, said annular scale being connected with the pointer or hand concentrically to the support thereof and being rotatable therewith over the rotatable disk.

2. A geographical clock, comprising a clock mechanism provided with a pointer or hand which makes one complete revolution every twenty-four hours, a permanently fixed annular time dial arranged concentrically to the support of said pointer or hand and scaled so as to indicate the successive twenty-four hours of a day and their subdivisions, a disk mounted within said time dial and provided with radial lines indicating longitudes and with concentric lines indicating latitudes of places located on either the Northern or Southern Hemisphere and depicted on said disk, and an annular scale indicating hours and the subdivisions thereof arranged concentrically to the center of said disk and connected with the pointer or hand and rotatable therewith.

In testimony that I claim the foregoing as my invention I have signed my name in presence of the subscribing witnesses this 24th day of March 1906.

PATRICK G. CONNOR.

Witnesses:
F. A. STEWART,
C. E. MULREANY.